United States Patent [19]
Hendriks et al.

[11] Patent Number: 4,535,506
[45] Date of Patent: Aug. 20, 1985

[54] METHOD AND DEVICE FOR EVERTING FLEXIBLE TUBULAR MEMBER

[75] Inventors: Ivo G. M. Hendriks, Overpelt; Theo Stals, Peer, both of Belgium

[73] Assignee: Teepak, Inc., Oak Brook, Ill.

[21] Appl. No.: 548,168

[22] Filed: Nov. 2, 1983

[51] Int. Cl.³ .............................................. A22C 13/00
[52] U.S. Cl. .......................................... 17/45; 17/49; 17/1 R; 17/41
[58] Field of Search ....................... 17/41, 42, 1 R, 49, 17/45

[56] References Cited

U.S. PATENT DOCUMENTS 4,162,557 7/1979 Rasmussen ........................... 17/42 X Primary Examiner—Willie G. Abercrombie
Attorney, Agent, or Firm—Michael L. Dunn; William J. Crossetta; Donald C. Studley

[57] ABSTRACT

A method and device for everting flexible tubular members, such as food casings and the like, is disclosed wherein a tubular member is axially displaced by a frictional engagement means, which means is deposed in a distal end portion of the member, and which frictionally engages the interior surface of said member and displaces said member to a point where the member is folded back over itself (everted) and then displaces said everted member, from the point of everting over the exterior surface of the noneverted tubular member.

28 Claims, 7 Drawing Figures

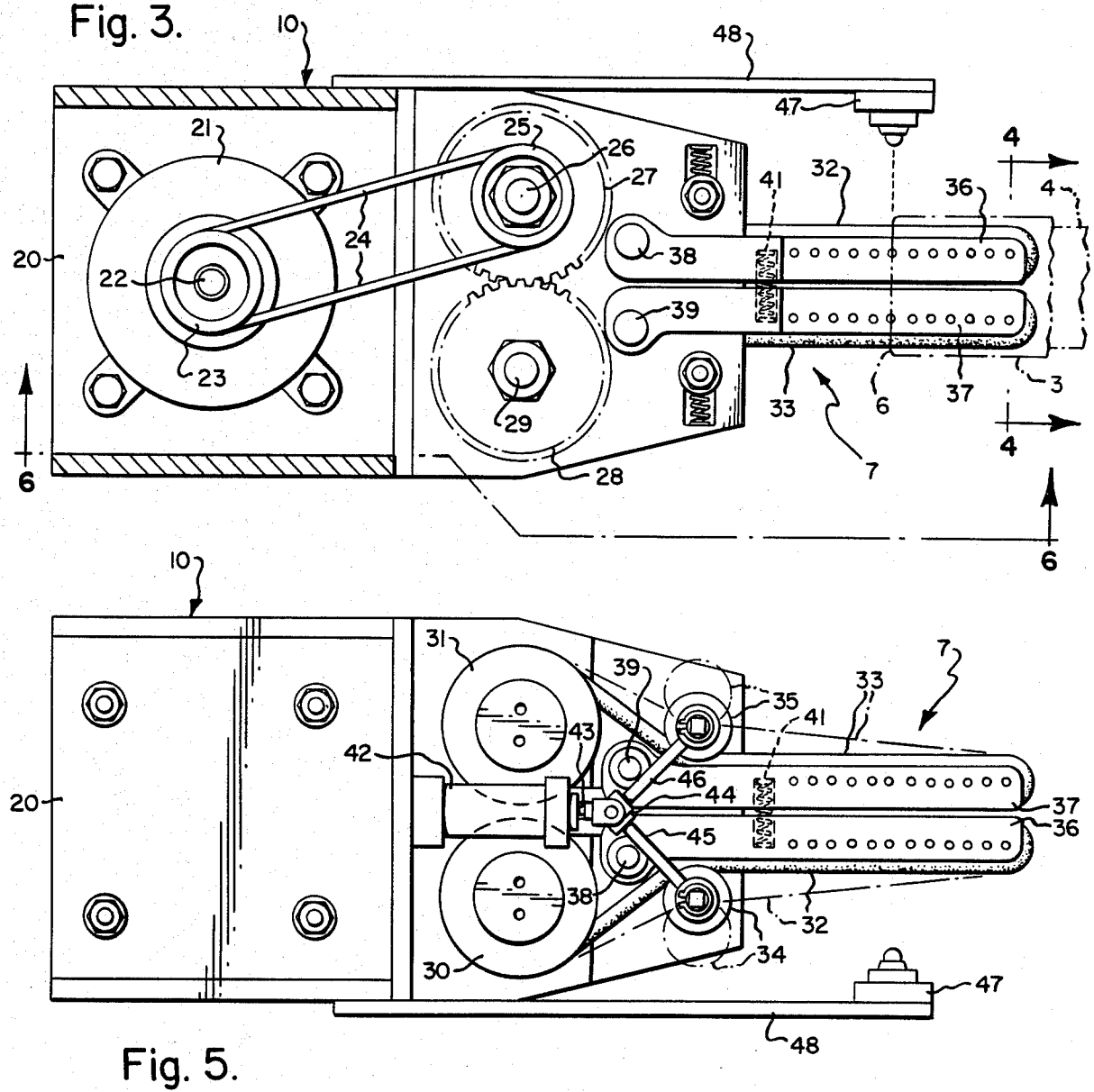
Fig. 3.
Fig. 5.
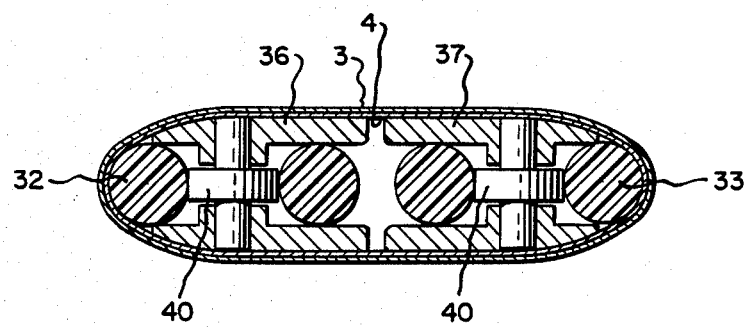
Fig. 4.

METHOD AND DEVICE FOR EVERTING FLEXIBLE TUBULAR MEMBER

TECHNICAL FIELD

This invention relates to a method and device for everting flexible tubular members, such as tubular food casings and the like, by means which frictionally engage the interior surface of the flexible tubular member in such manner as to effect everting by the combined force of pushing the casing to the point of everting and pulling the casing from the point of everting in such a manner as to reduce the longitudinal tensile forces on the casing at the point of everting.

BACKGROUND ART

In the production of flexible tubular members, such as food casings and the like, it is frequently desirable to coat and/or layer the interior surface of the tubular member with one or more of various compositions to achieve various effects. For example, when the tubular member is a cellulosic food casing, it may be desirable to coat the interior surface thereof with a moisture proof barrier coating containing compounds such as polyvinylidene chloride, polyolefins, vinyls, polyesters, nylons or other suitable copolymers and polymers; to coat the interior of the casing with compositions containing food release additives, or lubricants; to coat the interior of the casing with compositions containing a colorant or flavorant composition; or, any of multiple other compositions.

U.S. Pat. No. 3,378,379, describes one method of internally coating flexible tubular members wherein the coating composition is applied in a "slugg" to the interior of the tube during processing. Disadvantages of such process are the difficulty of controlling quality, quantity and drying the coating applied. One solution to the problems associated with slugg coating methods has been to coat the external surfaces of the tubular member, under regulated conditions to obtain the desired quantity and quality of coating being applied, then turning the tubing inside out so as to position the controlled coated surface on the interior of the tubing, a process called "everting".

U.S. Pat. No. 3,242,524 describes a method of everting wherein a substantially air impermeable tubular material having a closed end is everted by utilizing a pressure differential to pull the closed end portion through the noneverted casing. Such everting method requires a great deal of space and energy to achieve its goal and is only operable with substantially air impermeable tubular material having sufficient circumferential or hoop strength to resist the imposed air pressure.

U.S. Pat. No. 4,073,737 describes a device for everting tubular casing wherein the casing is passed through a ring member, folded back over the exterior surface of the casing and the ring member is displaced relative to the fixed casing end thereby everting the casing. The ring member is electromagnetically coupled to the displacing apparatus to obtain displacement. Such process requires substantial tensile strength of the casing in that it must be strong enough to sustain the forces necessary to "pull" itself through the point of everting plus withstand the weight of its unsupported length. There is also an incremental increase of abrasion at the point of everting which results from the electromagnetic attachment of the displacing apparatus and the ring member.

U.S. Pat. No. 4,162,557 describes a method and device of everting wherein tubular casing is shirred on a "stick", the end of the casing is closed and the tubing everted during deshirring by pulling one end of the shirred tubing through the bore of the shirred stick and out through the opposite end.

U.S. Pat. No. 4,292,711 describes a similar process and device for everting a shirred stick wherein the everting process is achieved during deshirring and stuffing of the casing with emulsified food products, thus pulling the casing through the opposite end utilizing the stuffing pressure differential. It should be readily apparent that coupling the everting process with shirring and/or stuffing significantly limits the commercial use of the process.

It is, therefore, a primary object of the present invention to provide a device for everting flexible tubular members which overcome the shortcomings of the prior art.

It is a further object to provide an everting method which permits space and energy efficient everting of unshirred flexible tubular members.

It is a still further object of the present invention to provide an everting method and device which acts to reduce the pulling forces at the point of everting.

These and other objects of the invention will become apparent from the specification, claims and the accompanying drawings.

SUMMARY OF THE INVENTION

The invention relates to a process and apparatus for turning an elongated flexible tubing inside out which comprises frictionally engaging the interior surface of the tubular member, axially dispacing said tubular member by means of such frictional engagement to a point of everting and drawing everted tubular member from the point of everting over the exterior surface of the tubular member.

By the process of the invention, means are provided to frictionally engage the interior surface of the flexible tubing to be everted thus continuously drawing the tubing axially to the point of everting. Any means can be utilized for frictional engagement though it is preferred to use opposing belt means frictionally engaging interior surfaces of the tubular member. When two opposing belt means are engaging the interior surface, engagement is preferably at opposite interior surfaces. It is also within the contemplation of the invention, however, to utilize more than two belt means displaced about the interior surface of the tubing.

The drawing of everted tubular member from the point of everting over the exterior surface of the tubular member can be achieved by multiple means. Preferably, such means comprise a gripping means which grips the distal everted end of the casing and means for varying the distance between the gripping means and the point of everting. Preferably, the gripping means is maintained stationary while the point of everting is moved progressively away therefrom, but the instant invention contemplates movements of either or both in the process of the invention.

As will be apparent from the aforesaid description, the instant invention contemplates a significant reduction of linear tensile force being applied axially to the flexible tubing during everting. As distinct from prior art processes which pull tubing through the point of everting, the instant invention pushes the tubing to the point of everting and thereafter pulls the everted casing away from the point of everting. The result is a significant decrease in tensile forces at the point of everting where the casing is also being subjected to shearing forces occasioned by its deformation from being turned inside out. This reduction in tensile force decreases the tendency of the tubing to rupture and/or abrade at the point of everting.

The tubing suitable for use in the present invention can be flexible, seamed or seamless tubing made from multiple materials. Preferred tubing is that used as casings for food products such as seamed or seamless tubing formed of regenerated cellulose, cellulose ether such as the ethyl, propyl, hydroxy, alkyl and the like ethers, proteins, carbohydrates, collagens, alginates, starches as well as other synthetic or artificial materials. The tubing can also be reinforced with fibers such as, for example, those employed in the production of paper, rice paper, and the like, hemp, rayon, flax, nylon, polyethylene terephthalate and the like. The tubing can be substantially air impermeable or it can be porous such as net-line sheathing and the like.

The tubular casings can be made by any known process such as, for example, by the cuprammonium, decetylation of cellulose acetate, viscose, denitration of cellulose nitrate processes or extrusion or appropriate compositions. Tubular casings reinforced with fibers can be made by the method and apparatus described, for example, in U.S. Pat. Nos. 2,105,273; 2,144,889; 2,910,380; 3,135,613 and 3,433,663.

Coating materials suitable for use as coatings with tubular food casings are well known and may be prepared, for example, from polyvinylidene chloride resin copolymers, polyethylene and other polyolefin resins, polyester resins, nylon, polyurethane resins and suitable combinations thereof. The coating is applied to the exterior surface of the casing whereupon the casing is then turned inside out using the process of this invention.

The use and type of a primer on the surface of casing employed prior to application of the coating or applying the coating directly to the surface of the casing will depend on the type of coating to be employed, the degree of adhesion required and the service requirements for the casing. It is known, for example, that various cationic thermosetting resins are advantageously employed as primers for enhancing adhesion of certain polyvinylidene chloride copolymer coatings to cellulosic casing surfaces. Exemplary of polyvinylidene chloride copolymer resins coatings advantageously employed with tubular food casings and the method of application, may be found, for example, in the disclosures of U.S. Pat. Nos. 2,961,323, 3,328,330 and 3,369,911.

In certain instances, it may be desirable to coat the interior surface of the non-everted casing with a friction increasing or decreasing agent, additive or similar material to aid in the frictional engagement of the interior surface. Such agent, additive etc., may be applied by known methods such as "slugging" techniques or may be applied by means in conjunction with the frictional engagement means.

BRIEF DESCRIPTION OF THE DRAWINGS

FIG. 3 is a partial cross section top view of the opposing belt apparatus.

FIG. 4 is a vertical cross section of the belt bar apparatus of an embodiment of the invention.

FIG. 5 is a bottom view of the opposing belt apparatus.

DESCRIPTION OF THE PREFERRED EMBODIMENT

Figure 1:
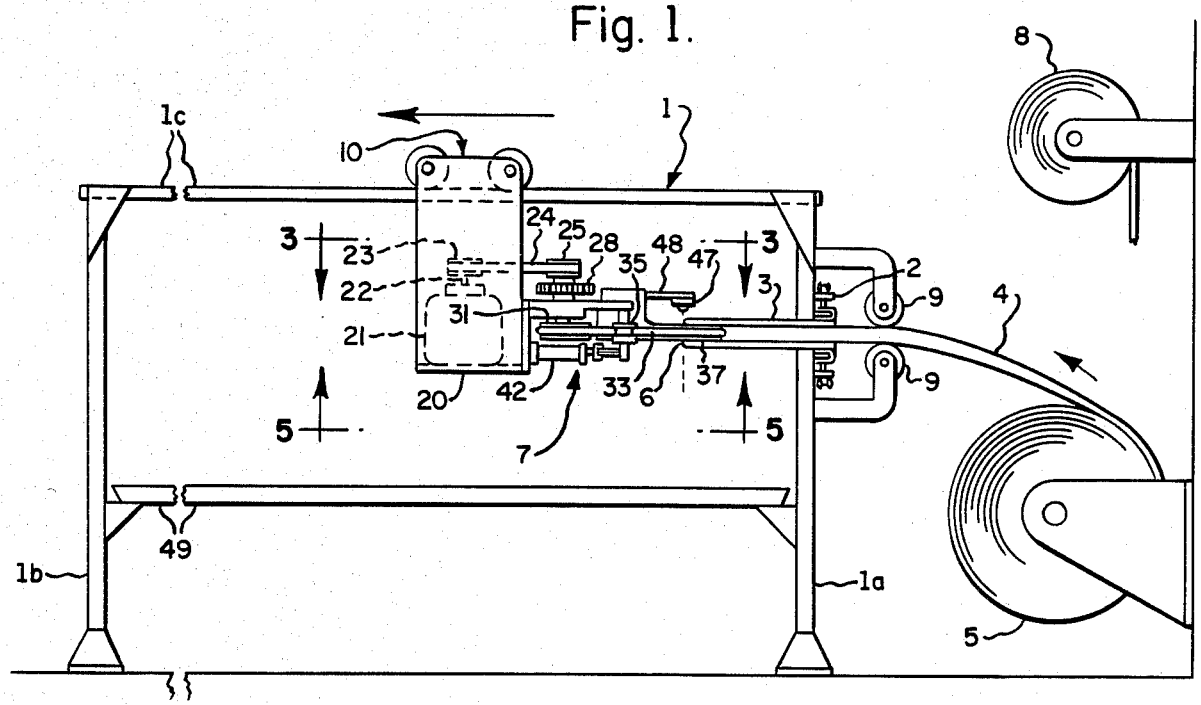
FIG. 1 is a schematic view of the device of the present invention, illustrating one stage of the eversion process.
Figure 2:
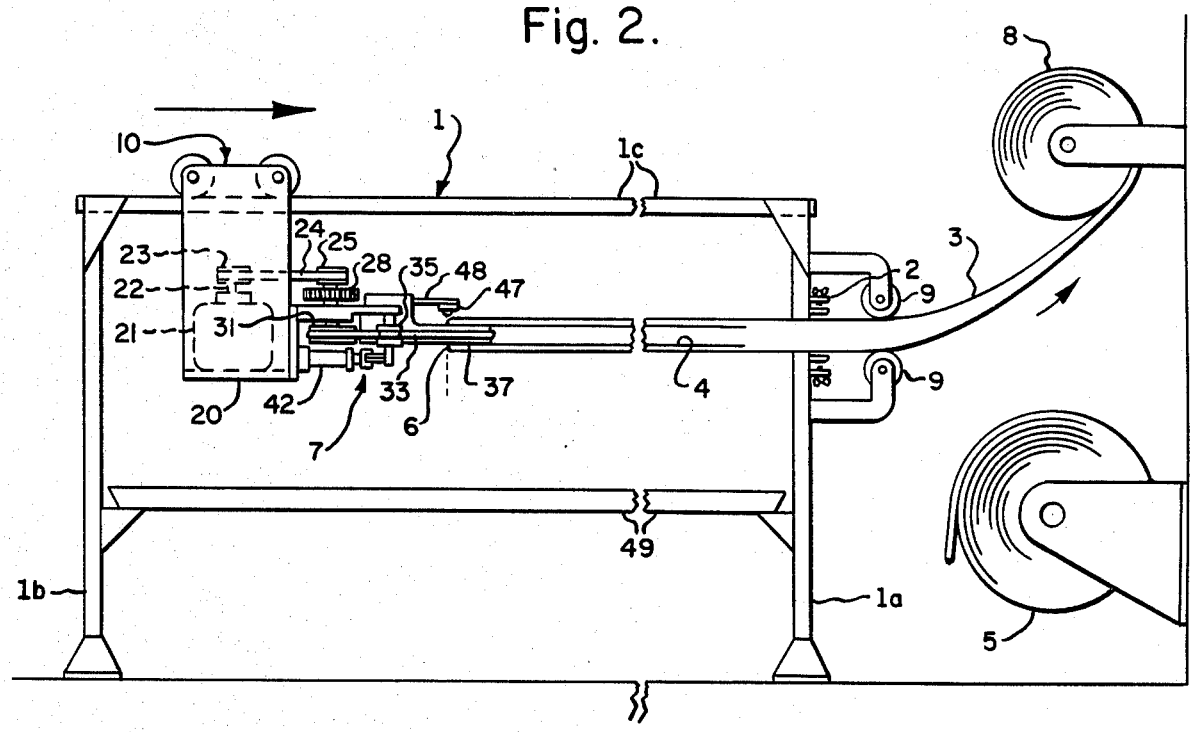
FIG. 2 is a schematic view of the device of the present invention, illustrating a second stage of the eversion process.

In a preferred embodiment of the invention as shown in the drawings and referring particularly to FIGS. 1 and 2, the invention comprises a frame 1 for supporting the apparatus, a clamp 2 for gripping an everted distal end portion 3 of flexible tubular member 4, supplied from supply reel 5 which is everted at everting point 6 by means of opposing belt apparatus 7. Take up reel 8 receives the everted tubular member.

The frame 1 comprises spaced vertical members 1a and 1b and a horizontal connecting track member 1c. Supply and takeup reels 5 and 8 respectively, are located near the frame 1. A pair of guide rollers 9 are positioned near the supply reels 8 and 5 and the clamp 2 is attached to the frame member 1a. The opposing belt apparatus 7 is displaced along track member 1c of frame 1 by being mounted to carriage 10 which is driven by suitable drive means (not shown).

Figure 6:
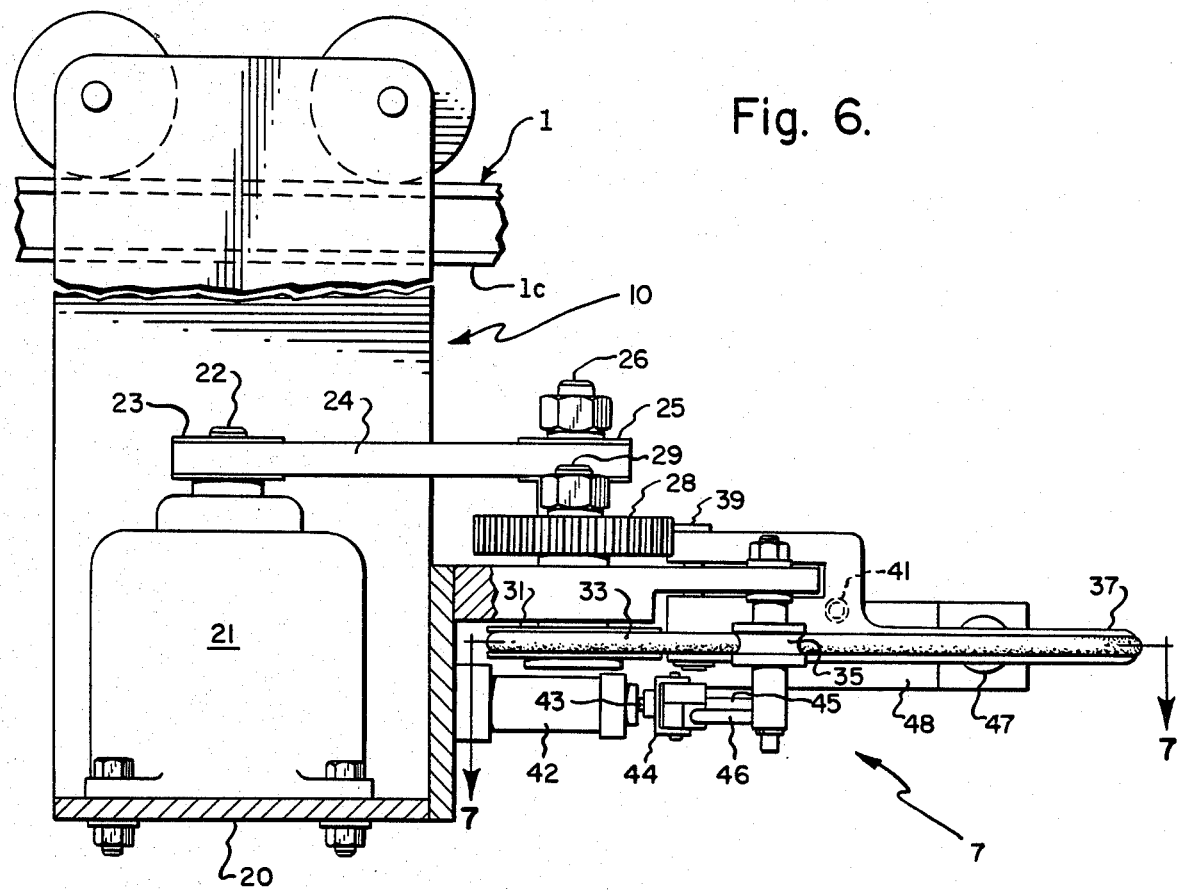
FIG. 6 is a partial cross section side view of the opposing belt apparatus.

The opposing belt apparatus is more particularly shown in FIGS. 3-7. In FIGS. 3, 5 and 6, representing top, bottom and side views respectively of the apparatus, wherein frame 20, supports everting drive means 21 which is cooperatively engaged through shaft 22, pulley 23, belt 24, pulley 25 and shaft 26, to cause gear 27 and equal sized intermeshed gear 28 and shaft 29 to rotate in opposing directions at the same speed. Each of shafts 26 and 29 extend through frame 20 and engage one of equal size drive pulleys 30 and 31 which each drive a belt 32 and 33 around adjacent guide rollers 34 and 35 onto belt bars 36 and 37. The belt bars are pivotably attached by shafts 38 and 39 and comprise multiple rollers 40 to allow relatively free rotation of belts 32 and 33 about belt bars 36 and 37. Pivotal attachment of the belt bars at 38 and 39 allow coordinated adjustment of the belt bar with the interior width of the flexible tubing being everted, through adjustable spring tension means 41. Air cylinder 42 extends and contacts piston 43 which acts through pivot coupling 44 and arms 45 and 46 to variably engage adjacent rollers 34 and 35 on belts 32 and 33, thereby allowing variable adjustment of the angle of the belts contacting the interior surface of the tubing. Edge detector 47, adjustably mounted on frame member 48 detects the position of the point of everting along the belt bars and is interconnected, by conventional control means, with air cylinder 42, everting drive means 21 and carrier drive means (not shown) to allow coordinated adjustment of the aforesaid elements. The edge detector can be any suitable conveniently available means such as laser detecting means, optical, mechanical, electrical or combination thereof edge detecting means. Electric eye edge detecting means are preferred.

Thus, in operation, the edge detector 47 senses the location of the point of everting on the belt bars, and detects changes therein. Conventional control means interconnect the edge detector with the carrier drive means and/or everting drive means 21 to adjust either or both the speed of carrier displacement along horizontal track member 1c or the speed of everting. Preferably, both the carrier drive means and everting drive means are separate variable speed drive means. Air cylinder 42 actuates adjustment of guide rollers 34 and 35 before, during or after the everting cycle as needed. Typically there is little need for vascillating adjustment of the guide rollers during an everting cycle except when utilizing irregular diameter and/or thickness tubing. Generally, however, as the distance of the carrier from the gripping means increases, the force of frictional engagement of the opposing belt means to the interior surface of the tubing is advantageously increased by adjustment of the belts through air cylinder 42.

FIG. 4 depicts a cross section view at 4—4 of belt bars 36 and 37, showing the relative operating position of belts 32 and 33 rollers 40, noneverted flexible tubular member 4 and everted flexible tubular member 3.

Figure 7:
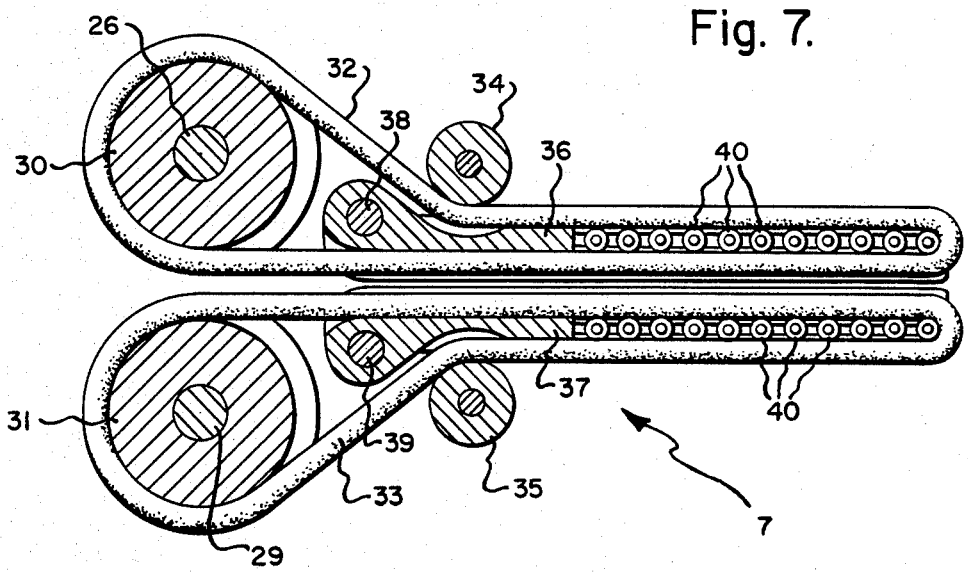
FIG. 7 is a top view, horizontal cross section of the belt bar apparatus of an embodiment of the invention.

FIG. 7 depicts a top view, horizontal cross section at 7—7 of belt bar 36 and 37, showing the relative operating position of belts 32 and 33, rollers 40, guide rollers 34 and 35 and drive pulleys 30 and 31.

FIG. 1 depicts operation with, for example, the flexible tubular member being thin walled flexible tubular food casing, wherein a free end of the casing 4 is drawn from the supply reel 5, passed between guide rollers 9, onto belt bars 36 and 37, doubled back over and the so everted distal end portion 3 being fastened into clamp 2. The exact position of the everting point 6 along belt bar 36 and 37 is not critical and as will be seen in the discussion hereafter can be adjusted if desired. The spread of the belt bars is pivotably adjusted about shaft means 38 and 39 such that the outside surface of belts 32 and 33 frictionally engage opposing interior surfaces of the flexible casing so that noneverted casing will be drawn from supply reel 5. It should be understood that the instant invention contemplates combinations of adjustment means including springload adjustment means 41, pneumatic adjustment means 42, etc., which may be sensor or otherwise controlled to provide indexed frictional engagement force on the interior surface of the flexible tubular member.

Referring back to FIG. 1, as the opposing belt apparatus engages and draws the noneverted tubular member from the supply reel, the carriage is caused to move along track 1c at a displacement rate approximately equal to the rate at which casing is drawn from the supply reel. Movement of the carriage can be by suitable separate drive means or can be by cooperative engagement with the everting drive means of the opposing belt apparatus. Thus it can be seen that as the casing is drawn from the supply reel and the apparatus is displaced at an equal rate along track 1c, the point of everting 6 should remain constant in relation to the belt bars. The drive means of the apparatus are interconnected with sensing device 47 proximate the belt bars which acts in adjustment of drive speed to adjust the position of everting point 6 as may be desired.

Referring now to FIG. 2 when the carriage 10 has reached the limit of its traverse on track 1c, proximate verticle support member 1b, the noneverted portion 4 of the casing is severed adjacent to clamp 2. The free end of the everted casing 3 is then removed from the clamp, attached to take-up reel 8, and wound thereon. Typically, the free end of the everted casing is spliced to previously everted casing already on take-up reel 8 and take-up reel 8 is automatically driven by separate drive means (not shown) thus winding up the everted casings. The direction of the carriage can be reversed with the opposing belt apparatus drawing the noneverted casing at a rate equal to the rate of its displacement along 1c back to its starting position adjacent verticle support 1a and at a rate equal to the take-up of take-up reel 8. Alternatively, the carriage and opposed belt apparatus can be maintained at the end of its traverse or at some point therebetween, with the opposing belt apparatus continuing to draw the remaining noneverted tubing at a rate equal or proximate to the rate of wind up on take-up reel 8. When the cut end of uneverted casing 4 is drawn up the belt bars and everted, the casing will no longer be supported at the end of the frame near 1b and drops to the supporting structure. A trough 49 is provided to prevent the everted casing from becoming soiled or damaged as it is being wound on take-up reel 8, typically such trough will include roller conveyor means to avoid damage to the casing.

It is important to note that the amount of casing which can be everted in the course of a single operation is at least equal to twice the distance between the two verticle frame members 1a and 1b, and that the forces imposed on the casing during the everting process are minimal, thus representing a significant efficiency in space and energy. Of particular interest, the forces at the point of everting are a combination of push from the opposed belt apparatus and pull from the weight of unsupported casing resulting in a reduction in tensile forces at the point of everting over prior art apparatus.

The invention being aforesaid described, it will be obvious that the same can be varied in many ways. Such variations are not to be regarded as a departure from the spirt and scope of the invention, but all such modifications are intended to be included within the scope of the following claims.

What is claimed is:

1. A device for everting a flexible tubular member or the like comprising frictional engagement means insertable into a distal end portion of said tubular member to frictionally engage the interior surface thereof to axially displace said tubular member to a point of everting, and means for displacing everted tubular member from the point of everting over the exterior surface of the noneverted tubular member.

2. The device of claim 1 wherein said flexible tubular member is a thin walled tubular casing.

3. The device of claim 2 wherein said casing is sausage casing.

4. The device of claim 1 wherein said frictional engagement means is a belt means.

5. The device of claim 4 wherein said belt means engage opposite interior surfaces of said tubular member.

6. The device of claim 1 comprising a support frame, clamping means mounted on the frame for gripping a distal end portion of an everted portion of the tubular member, frictional engagement means, adapted for insertion into a distal end portion of the noneverted tubular member which noneverted portion is telescoped with respect to the everted portion of the tubular member, said engagement means frictionally engaging the interior surface of said noneverted tubular member axially displacing said noneverted tubular member to a point of everting, and carrier means for displacing said frictional engagement means relative to said clamping means, lengthwise of the casing for thus everting said noneverted tubular member.

7. The device of claim 6 wherein said frictional engagement means is a belt means.

8. The device of claim 7 wherein said belt means engages opposite interior surfaces of said noneverted tubular member.

9. The device of claim 6 wherein said carrier means and said frictional engagement means are driven by a common drive means.

10. The device of claim 6 wherein said carrier means is separately driven from said engagement means.

11. The device of claim 6 wherein at least one of said carrier and engagement means is driven by variable drive means.

12. The device of claim 6 comprising an everting point detecting means.

13. The device of claim 6 comprising variable frictional engagement means.

14. The device of claim 6 comprising a supply reel adapted for supplying noneverted tubular member to the frictional engagement means.

15. The device of claim 6 comprising a trough means mounted below the frictional engagement means and adapted to support everted tubular member along at least a portion of the traverse of the displacing carrier means.

16. The device of claim 15 wherein said trough means comprises a roller conveyer means.

17. The device of claim 6 comprising a take-up reel adapted for winding up everted tubular member.

18. The device of claim 7 wherein the force of frictional engagement of said belt means to the interior surface of said tubular member is adjustable.

19. The device of claim 18 wherein adjustment of the force of frictional engagement is by variation of the distance between belt bars.

20. The device of claim 18 wherein adjustment of the force of frictional engagement is by variation of the belt surface area contacting the interior surface of the tubular member.

21. The device of claim 6 wherein said tubular member is sausage casing.

22. A method for everting a flexible tubular member comprising frictionally engaging the interior surface of said tubular member, axially displacing said member to a point of everting by means of said frictional engaging, everting, and displacing everted tubular member from the point of everting over the exterior surface of the noneverted tubular member.

23. The method of claim 22 wherein said flexible tubular member is a thin walled tubular casing.

24. The method of claim 22 wherein said casing is sausage casing.

25. The method of claim 22 wherein a distal end portion of said tubular member is everted and gripped, the interior noneverted distal end portion of said tubular member, telescoped with respect to the everted portion of the member, is frictionally engaged to axially displace said noneverted tubular member to a point of everting, and the point of frictional engagement is displaced relative to the point of gripping lengthwise for thus everting noneverted portion of said tubular member.

26. Everted flexible tubular member formed by a method comprising frictionally engaging the interior surface of an unshirred noneverted tubular member to a point of everting, everting and displacing everted tubular material telescopically from the point of everting over the exterior surface of the noneverted tubular member.

27. The everted tubular member of claim 26 wherein said member is a thin walled casing.

28. The thin walled casing of claim 27 wherein said casing is a sausage casing.

* * * * *